Figure 1:
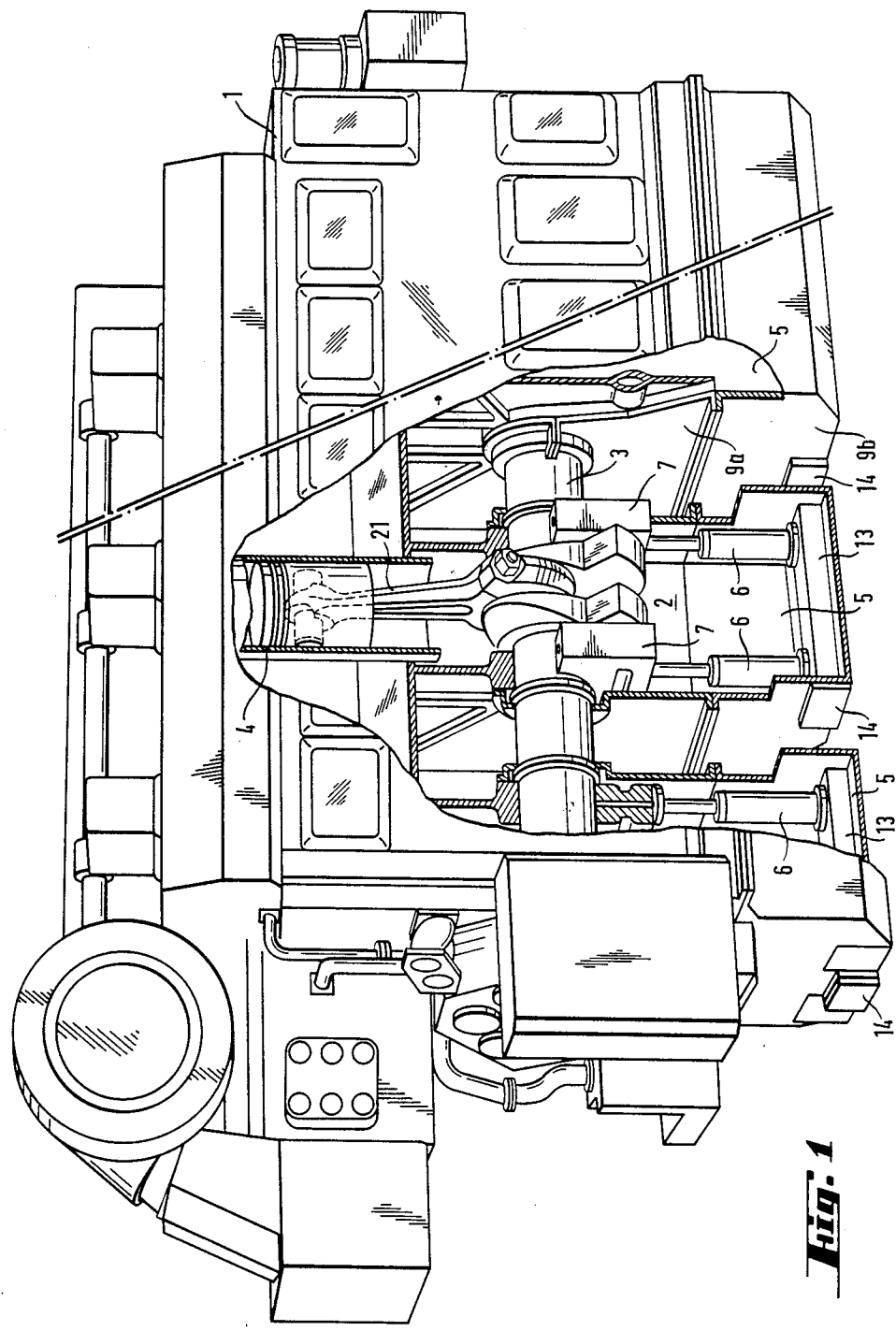

United States Patent [19]

Liljenfeldt et al.

[11] Patent Number: 4,967,035
[45] Date of Patent: Oct. 30, 1990

[54] METHOD FOR TESTING DIFFERENT SUBSTANCES AND A COMBUSTION ENGINE FOR APPLYING THE METHOD

[75] Inventors: Gösta Liljenfeldt, Solf; Carl-Erik Rösgren, Vikby; Harry Sjöberg; Rolf Vestergren, both of Vaasa, Finland

[73] Assignee: Oy Wärtsilä Ab, Helsinki, Finland

[21] Appl. No.: 258,783

[22] Filed: Oct. 17, 1988

[30] Foreign Application Priority Data

Oct. 23, 1987 [FI] Finland .................................. 874689

[51] Int. Cl.⁵ .......................................... G01M 15/00
[52] U.S. Cl. .......................................... 73/116; 73/64
[58] Field of Search ..................... 73/116, 865.6, 117.3, 73/118.1, 119 R, 10, 64

[56] References Cited

U.S. PATENT DOCUMENTS

| 3,631,710 | 1/1972 | Lunifeid | 73/35 |
| 3,687,231 | 8/1972 | Scheiterlein | 184/6.5 |

FOREIGN PATENT DOCUMENTS

| 223034 | 12/1983 | Japan | 73/116 |
| 1315856 | 6/1987 | U.S.S.R. | 73/116 |

Primary Examiner—Jerry W. Myracle
Attorney, Agent, or Firm—Dellett, Smith-Hill & Bedell

[57] ABSTRACT

The invention relates to a method, and to an engine for applying the method, for testing different substances, such as lubrication substances, cooling substances and/or fuels or the like, in a combustion engine, especially in a big diesel engine, which comprises at least two, preferably several cylinders. According to the invention at least for the part of one cylinder the supply and circulation of at least one substance is arranged separately and sealed from the corresponding substance systems for the other cylinders of the engine, and for the part of said cylinder the composition and/or some physical property, for instance temperature, of said substance to be supplied is changed in comparison with the substance to be circulated simultaneously in the corresponding substance system for the other cylinders in the engine. Additionally for testing of lubrication and cooling substances the part of the crankshaft and of the crankcase of the engine corresponding to said cylinder is sealed by means of partitions tightly from the parts of the crankshaft and of the crankcase corresponding to the adjoining cylinders and is provided at the position between said partitions with separate supply and distribution ducts for lubrication and cooling substances.

27 Claims, 3 Drawing Sheets

METHOD FOR TESTING DIFFERENT SUBSTANCES AND A COMBUSTION ENGINE FOR APPLYING THE METHOD

The invention relates to a method for testing different substances in a combustion engine and to a combustion engine, especially a big diesel engine, for applying the method.

In this context big diesel engines refer to engines of such an output range so as to be applicable for heating power plants, or for auxiliary or main marine engines, for example. In accordance with a known testing technique different lubrication oil, cooling substance and/or fuel grades are tested in one or several engines one grade at a time. When this kind of method is used testing takes a lot of time. The method is also expensive due to considerable investment and operation costs caused by the engines. In these respects the problems are especially great when one wishes to examine the effect created jointly by several of the above mentioned substances with different grades thereof.

An aim of the invention is to essentially eliminate the drawbacks apparent in the known technique. A further aim is to provide an engine applicable for testing by using relatively simple measures and arrangements for modification of a conventional engine construction.

Thus, in accordance with the invention, by separating the medium systems and circuits of one or several cylinders of the engine so as to be independent of one another, different medium grades can be tested simultaneously by means of the same engine. Separating can relate to lubrication medium, cooling medium as well as fuel systems. By extending this kind of separating to relate to several or even all of the cylinders of the engine as well as to said different mediums, it is possible to simultaneously test by the same engine separate lubrication medium grades, different cooling substances and different fuel grades and to obtain test results about the separate mutual combinations thereof substantially quicker than by using previously known testing methods. When testing is accomplished in one and the same engine the results are mutually better comparable, because the conditions between separate cylinders of the same engine are more similar than the conditions in cylinders of separate engines.

Especially for testing different lubrication oil grades in a cylinder, that part of the crankshaft and of the crankcase of the engine which corresponds to the selected cylinder is tightly sealed by means of partitions from those parts of the crankshaft and of the crankcase corresponding to the adjoining cylinders and said part of the crankshaft is provided with separate supply and distribution channels between said partitions. By arranging the partition to extend to the oil pan and by arranging the crankshaft to go tightly through the partition the lubrication oil under test can easily be arranged to circulate fully independently of the other cylinders and the lubrication circuits thereof. It should be noted that in practice the lubrication oil can advantageously be arranged to be supplied in a known way through the crankshaft, the connecting rod and the piston into the cylinder and back therefrom into the crankcase, whereby the lubrication oil serves at the same time as a cooling substance. The supply can easily be arranged as is disclosed in the Finnish patent No. 53165.

In addition the engine can naturally be provided with separate channels arranged in the engine block for the cooling substance, which channels, in accordance with the invention, are arranged for each cylinder separately with regard to one another. Hereby, at the same time, separate properties of the cooling substance can with advantage be tested, for instance the influence of different temperatures of water, when used as cooling substance, on the operation of the engine. Likewise by providing one or several cylinders with a separate fuel feeding system, when desired, different fuel grades can be tested simultaneously together with different lubrication substance and cooling substance grades.

Figure 2:
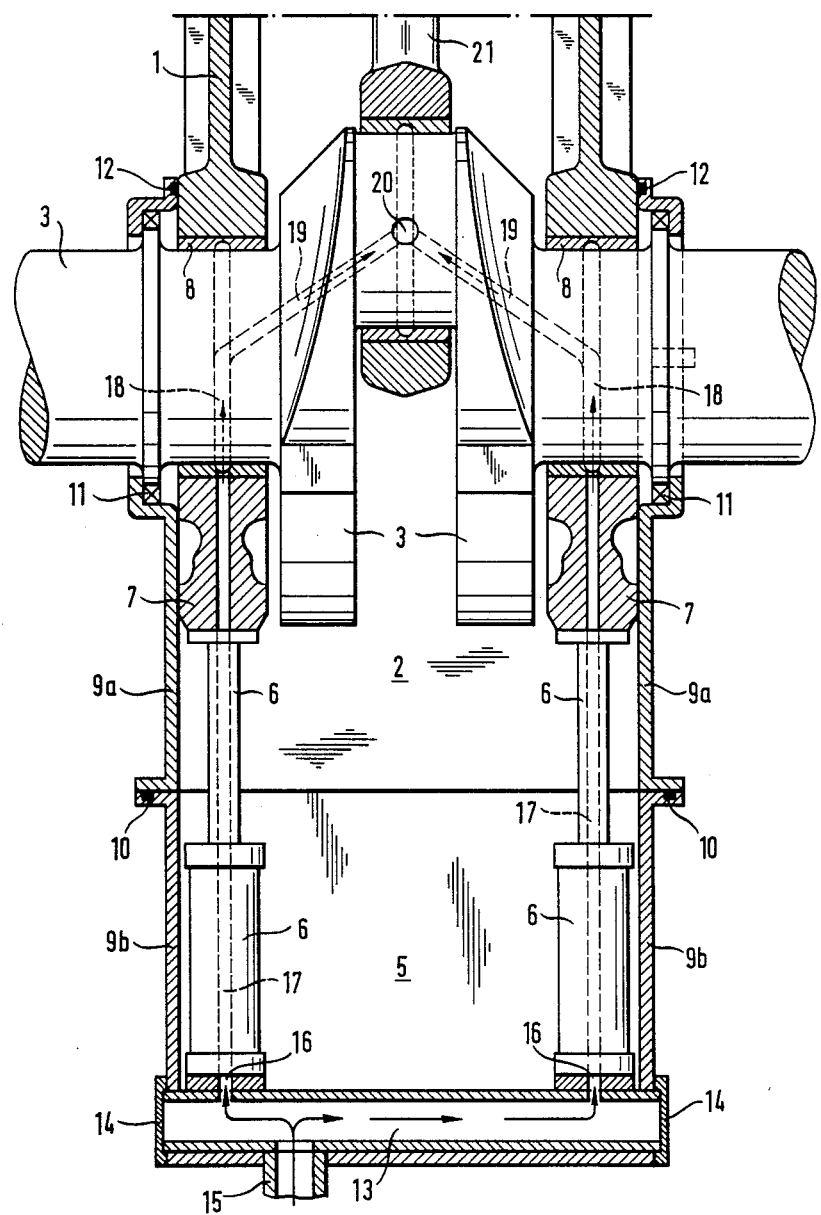
Figure 3:
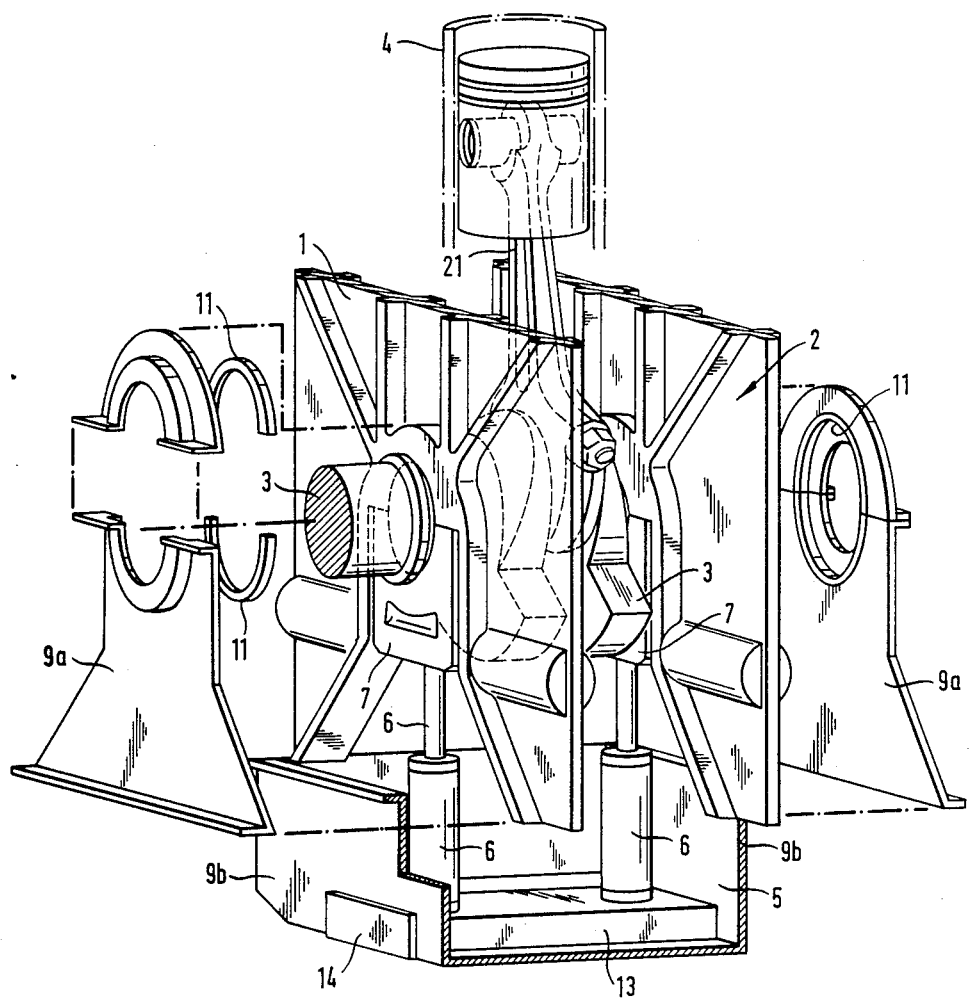

In the following the invention is described more in detail with reference to the attached drawing, in which FIG. 1 shows as a perspective view an engine according to the invention partly in section, FIG. 2 shows as a sectional view, at the position of one cylinder, the crankshaft and the crankcase of the engine of FIG. 1 sealed from the other parts of the engine as presumed by the invention, FIG. 3 shows as a perspective view, at the position of one cylinder, the crankshaft and the crankcase of the engine of FIG. 1 sealed by means of partitions from the other parts of the engine.

In the drawing the reference numeral 1 indicates an engine block, 2 a crankcase, 3 a crankshaft, 4 a cylinder liner and 5 an oil pan. The crankshaft is supported by means of main bearings 8. The support for the bearings is arranged in accordance with a principle, more clearly disclosed in the Finnish patent No. 53165, by making use of a main bearing seat 7 and a telescopic support construction 6, which for its part is at the other end fixed to an oil duct 13 of a lubrication system. The crankcase 2 and the crankshaft 3 are for the part of said cylinder of the engine tightly sealed from the other corresponding parts of the engine by partitions 9a and 9b supported to one another and by additionally using gaskets 10, 11 and 12.

The lubrication oil system itself includes said oil duct 13, which by means of plugs 14 is sealed from the corresponding oil duct included in the lubrication system for the other cylinders. The supply of oil takes place by pumping through a pipe 15 (disclosed only schematically). Through openings 16 in the oil duct the oil is further transmitted from the oil duct 13 through an inner duct 17 in the support structure 6 and 7 into the main bearing 8, from there into ducts 18 and 19 made in the crankshaft 3 and further through an opening 20 into a connecting roll 21. Through the connecting rod the oil is transmitted in a known way (not shown in the drawing) through a piston pin and a piston into the cylinder liner 4 serving simultaneously both as lubrication medium and cooling medium. Through the cylinder liner the oil flows back into the crankcase to be recovered for recirculation. As shown in FIG. 2 by this means the lubrication oil system of a conventional big diesel engine can in a simple way be separated for the part of separate cylinders to be an entity of its own, in which different lubrication oil grades can be circulated and tested quite independent of other cylinders.

The provision of a cooling system for each cylinder for its part can in practice be accomplished for instance by sealing the cooling water ducts of the cylinder from the other cooling ducts and by arranging in the engine new fuel supply positions and outlets respectively and independent means to provide the supply and circulation. Further, when there is a desire at the same time to examine different fuel grades the cylinders are correspondingly also provided with fuel supply means of their own. By this means it is possible in the same engine at the same time to test separate lubrication substance, cooling substance and fuel grades either separately or in any combinations for examining the general effect thereof on the operation of the engine.

The invention is not limited to the embodiment shown but several modifications are feasible within the scope of the attached claims.

We claim:

1. A method for testing fluids in a diesel engine that comprises at least first and second cylinders, a fluid supply system for supplying a fluid to all cylinders of the engine, a crankshaft having length segments associated with the cylinders respectively, and a common crankcase through which the crankshaft extends, said method comprising the following steps:
   (1) isolating parts of the fluid supply system for supplying fluid to the first cylinder from parts of the fluid supply system for supplying fluid to the second cylinder,
   (b) supplying a first fluid to said first cylinder by way of the parts of the fluid supply system for said first cylinder, and
   (c) simultaneously supplying a second fluid, different from the first fluid, to said second cylinder by way of the parts of the fluid supply system for said second cylinder.

2. A method according to claim 1, wherein step (a) comprises installing partitions in the crankcase to separate the part of the crankcase in which the segment of the crankshaft associated with said first cylinder extends from other parts of the crankcase.

3. A method according to claim 1, wherein the fluid is a fuel.

4. A method according to claim 1, wherein the second fluid is different in composition from the first fluid.

5. A method according to claim 1, wherein the second fluid has the same composition as the first fluid but the value of a selected physical property associated with the second fluid is different from the value of that property associated with the first fluid.

6. A method for testing fluids in a combustion engine that comprises at least first and second cylinders and a system for supplying and circulating fluid to all of the cylinders, said method comprising the steps of:
   (a) isolating parts of the fluid supply and circulation system for supplying fluid to the first cylinder from parts of the fluid supply and circulation system for supplying fluid to the second cylinder,
   (b) supplying a first fluid to said first cylinder by way of the parts of the fluid supply and circulation system for said first cylinder, and
   (c) simultaneously supplying a second fluid, different from the first fluid, to said second cylinder by way of the parts of the fluid supply and circulation system for said second cylinder.

7. A method according to claim 6, wherein the fluid is a lubricant.

8. A method according to claim 7, wherein the engine comprises an engine block in which cylindrical bores of the respective cylinders are formed, a crankcase attached to the engine block, and a crankshaft extending within the crankcase and having length segments associated with the cylinders respectively, and step (a) comprises mounting partitions in the crankcase for separating the part of the crankcase in which the length segment of the crankshaft associated with said first cylinder extends from other parts of the crankcase.

9. A method according to claim 6, wherein the fluid is a coolant.

10. A method according to claim 9, wherein the engine comprises an engine block formed with cylindrical bores associated with said cylinders respectively, the engine block being formed with coolant ducts, and step (a) comprises isolating coolant ducts associated with said first cylinder from coolant ducts associated with the second cylinder, step (b) comprises supplying a first fluid coolant to said first cylinder by way of the coolant ducts associated with said first cylinder, and step (c) comprises simultaneously supplying a second fluid coolant, different from the first fluid coolant, to said second cylinder by way of the coolant ducts associated with said second cylinder.

11. A method according to claim 6, wherein the second fluid is different in composition from the first fluid.

12. A method according to claim 6, wherein the second fluid has the same composition as the first fluid but the value of a selected physical property associated with the second fluid is different from the value of that property associated with the first fluid.

13. A combustion engine for testing fluids, said engine comprising at least first and second cylinders, a crankshaft having length segments associated with the cylinders respectively, a common crankcase through which the crankshaft extends, a fluid supply and circulation system for supplying fluid to the cylinders in recirculating fashion, means isolating parts of the fluid supply and circulation system for the first cylinder from parts of the fluid supply and circulation system for the second cylinder, and mans for separately supplying fluid to said parts of the fluid supply and circulation system for said first cylinder and said parts of the fluid supply and circulation system for said second cylinder.

14. A combustion engine according to claim 13, wherein the fluid supply and circulation system is a lubricant supply and circulation system.

15. A combustion engine according to claim 13, wherein the fluid supply and circulation system is a coolant supply and circulation system.

16. A combustion engine according to claim 13, comprising an engine block defining cylindrical bores associated with said cylinders respectively, and wherein said crankcase is secured to the engine block, said crankshaft extends within the crankcase and has plurality of length segments associated with the cylinders respectively, and the engine further comprises partitions mounted in the crankcase and separating the part of the crankcase in which the segment of the crankshaft associated with said first cylinder extends form other parts of the crankcase.

17. A combustion engine according to claim 16, wherein the fluid supply and circulation system comprises a system for supply and distribution of lubricant and the crankshaft is formed with supply and distribution ducts for lubricant, the ducts formed in the segment of the crankshaft associated with said first cylinder being isolated with respect to fluid flow from the ducts formed in the length segment of the crankshaft associated with the second cylinder.

18. A combustion engine according to claim 16, wherein the fluid supply and circulation system comprises a system for supply and distribution of coolant and the crankshaft is formed with supply and distribution ducts for coolant, the ducts formed in the segment of the crankshaft associated with said first cylinder being isolated with respect to fluid flow from the ducts formed in the length segments of the crankshaft associated with the second cylinder.

19. A combustion engine for testing fluids, comprising at least first and second cylinders, a supply and circulation system for supplying fluid to the cylinders in recirculating fashion, and means isolating parts of the fluid supply and circulation system associated with the first cylinder from parts of the fluid supply and circulation system associated with the second cylinder, so that a different fluid can be supplied to said first cylinder from that supplied to said second cylinder.

20. A combustion engine according to claim 19, wherein the supply and circulation system is a coolant supply and circulation system.

21. A combustion engine according to claim 20, comprising an engine block formed with said cylinders and with coolant ducts associated with the cylinders, the coolant ducts associated with said first cylinder being isolated with respect to fluid flow from the coolant ducts associated with said second cylinder.

22. A combustion engine according to claim 19, wherein the supply and circulation system is a lubricant supply and circulation system.

23. A combustion engine according to claim 22, comprising a crankcase having a lower part and an upper part, bearing supports mounted int he crankcase, crankshaft bearings mounted in the bearing supports, and a crankshaft journaled in the crankcase bearings, and wherein the part of the lubricant supply and circulation system associated with said first cylinder includes an oil duct int he lower part of the crankcase and passages in the bearing supports for delivering lubricant from the oil duct to the crankshaft bearings, said oil duct being isolated with respect to fluid flow from parts of the lubricant supply and circulation system associated with said second cylinder.

24. A combustion engine for testing different fluids, comprising an engine block defining at least first and second cylindrical bores, pistons fitted slidingly in said cylindrical bores, a crankcase secured to the engine block, a crankshaft extending within the crankcase and having at least first and second length segments associate with the cylinders respectively, connecting rods connecting the pistons to the respective length segments of the crankshaft, and a supply and circulation system for supplying fluid to the cylinders in recirculating fashion, said supply and circulation system having parts associated with each cylinder, the parts associated with the first cylinder being isolated with respect to fluid flow from the parts associated with the second cylinder.

25. A combustion engine according to claim 24, comprising partitions mounted int eh crankcase and separating the part of the crankcase in which the length segment of the crankshaft associated with said first cylinder extends from other parts of the crankcase, and wherein the parts of the supply and distribution system associated with said first cylinder include supply and distribution ducts located between said partitions.

26. A method for testing fluids in a combustion engine that comprises at least first and second cylinders, a first supply system for supplying fluid to all cylinders of the engine, and a second supply system for supplying a circulating fluid to all cylinders of the engine, said method comprising the following steps:
 (a) isolating parts of the first supply system for supplying fluid to the first cylinder from parts of the first fluid supply system for supplying fluid to the second cylinder,
 (b) isolating parts of the second supply system for supplying and circulating fluid to the first cylinder from parts of the second supply system for supplying and circulating fluid to the second cylinder,
 (c) supplying a first fluid to said first cylinder by way of the parts of the first supply system for said first cylinder and simultaneously supplying a second fluid, different from the first fluid, to said second cylinder by way of the parts of the first supply system for said second cylinder, and
 (d) supplying a third fluid to said first cylinder by way of the parts of the second supply system for said first cylinder and simultaneously supplying a fourth fluid, different from the third fluid, to said second cylinder by way of the parts of the second supply system for said second cylinder.

27. A combustion engine for testing fluids, said engine comprising at least first and second cylinders, a first fluid supply system for supplying fluid to the cylinders, means isolating parts of the first fluid supply system for the first cylinder from parts of the first fluid supply system for the second cylinder, means for separately supplying fluid to said parts of the first fluid supply system for said first cylinder and said parts of the first fluid supply system for said second cylinder, a second fluid supply system for supplying fluid to the cylinders separately from the first fluid supply system, means isolating parts of the second fluid supply system for the first cylinder from parts of the second fluid supply system for the second cylinder, and means for separately supplying fluid to said parts of the second fluid supply system for said first cylinder and said parts of the second fluid supply system for said second cylinder.

* * * * *